Patented Oct. 7, 1952

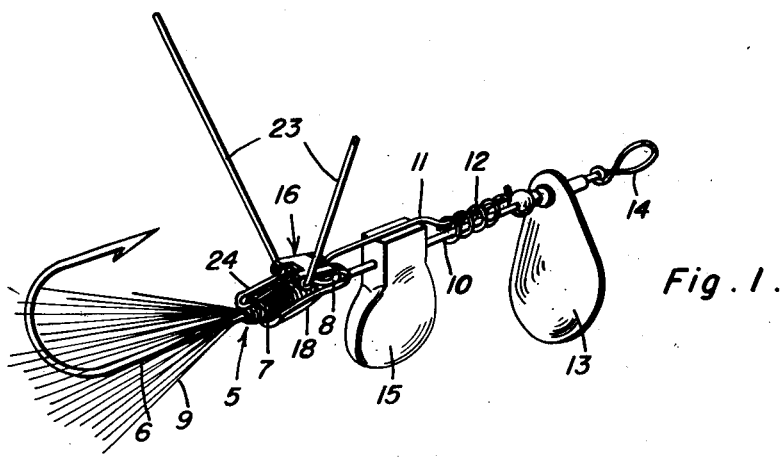
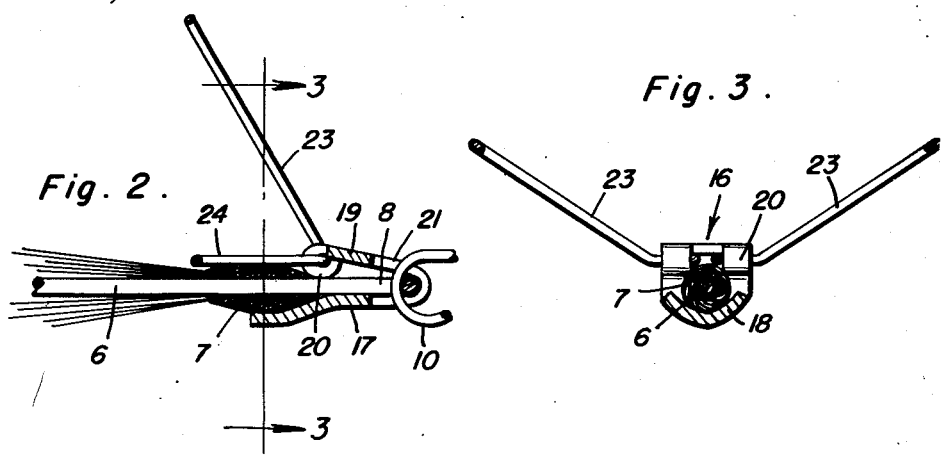
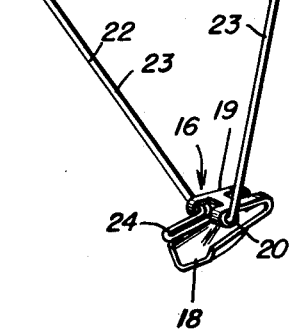
James E. Wadlington
Raymond Stinnitt
INVENTORS

2,612,715

UNITED STATES PATENT OFFICE 2,612,715

WEED GUARD FOR ARTIFICIAL LURES

James E. Wadlington, Celina, Tenn., and Raymond Stinnitt, Lexington, Ky., assignors of one-fourth to Bettie B. Wadlington, Celina, Tenn.

Application July 26, 1948, Serial No. 40,724

2 Claims. (Cl. 43—42.4)

The present invention relates to new and useful improvements in weed guards for fishing lures and has for its primary object to provide a device of this character which may be easily and quickly attached in position to an artificial lure without necessitating any changes or alterations in the construction thereof.

A further object of the invention is to provide an attaching clip for the weed guard by means of which the same may be attached to the body of the lure and to the eye of the fish hook forming the lure and including weed deflecting prongs carried by the clip.

A still further object is to provide means for pivotally attaching the prongs to the clip of the weed guard whereby to enable the prongs to swing freely in a direction to prevent interference with the striking of a fish at the lure.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout and in which:

Figure 1 is a perspective view;

Figure 2 is an enlarged longitudinal sectional view of the clip shown attached to the eye of a fish hook;

Figure 3 is a transverse sectional view taken substantially on a line 3—3 of Figure 2; and Figure 4 is a perspective view of the weed guard removed from the lure.

Referring now to the drawing in detail wherein for the purpose of illustration we have disclosed a preferred embodiment of the invention, the numeral 5 designates a fish lure of a conventional type and which includes a hook 6 having a substantially bulbous body portion 7 adjacent its front end and an attaching eye 8 at the front end of the hook forwardly of the body. The body portion 7 has an arcuate outer surface (Figure 3). Feathers or hairs 9 project rearwardly from the body to partially conceal the rear or bill portion of the hook 6.

A conventional type of connector 10 is secured to the eye 8, the connector being of the safety pin type and including a resilient pin 11 locked to the shank of the connector by a coil spring 12. A spinner 13 is rotatably mounted at the front end of the connector and forwardly thereof is a line attaching eye 14. A weight or ballast 15 is mounted on the connector at its rear portion and immediately in front of the eye 8.

The subject matter of the present invention comprises a weed guard member 16 and it includes a clip 17 having a lower trough 18 of arcuate cross-sectional form and positioned under the body 7. An eye 8 is at one end of the hook 6 and is located at one end of the clip 17. An upper plate or jaw 19 of the clip 17 overlies the eye 8, the jaw 19 being bifurcated at its rear end and having its extremities rolled to provide eyes 20 which are in contact with the top of the body 7. The front end of clip 17 is formed with a vertical slot 21 to receive the rear end of the connector 10. Since the body portion 7 has an arcuate outer surface and the trough 18 is also arcuate, the body portion nests within the trough 18.

A substantially V-shaped member 22 of wire construction to provide a pair of prongs 23 is bent adjacent the apex of the V, to swing forwardly and rearwardly in the bearings 20 and the crotch portion of the member 22 is bent rearwardly between the eyes or bearings 20 to form a stop or arm 24 which rests on top of body 7 of the lure to support the prongs 23 in a rearwardly inclined position when the lure is drawn through the water, as shown in Figure 2.

Accordingly, in the operation of the device weeds will be deflected from the hook 6 to prevent entanglement therewith and when a fish strikes hook 6 the nose of the fish striking prongs 23 will swing the prongs forwardly in eyes 20 to prevent interference with the hooking of the fish.

The prongs 23 of the guard are rearwardly inclined so that as the lure is drawn through the water, pressure will be exerted on the prongs and transmitted to the arm 24 to press and hold the body portion 7, as well as to support the prongs in the rearwardly inclined position.

It is to be understood, however, that even though there is herein shown and described a preferred embodiment of the invention, the same is susceptible to certain changes fully comprehended by the spirit of the invention as herein described and the scope of the appended claims.

Having thus described the invention, what is claimed as new is:

1. A weed guard for an artificial lure having a body with an arcuate outer surface, said guard comprising a clip provided with a trough at one end, the arcuate surface of said body being disposed in said trough, said clip having a pair of spaced bearing eyes contacting the body of the lure, a substantially V-shaped guard having a crotch and a portion adjacent to said crotch being pivoted in said bearing eyes for forward and rearward swinging movement, and a rearwardly projecting stop formed at the crotch of the guard and bearing against the body of the lure to hold the guard in a rearwardly inclined position and to press the lure body in said trough.

2. The weed guard of claim 1 and a fish hook having a shank portion centrally located in said body and held in position thereby under the influence of the prongs of the V-shaped guard when said V-shaped guard is swung in one direction by water pressure as the weed guard is drawn through water whereby said stop presses against said body of the lure, urging it into firm nested relation with said trough, so that the barb of the hook will occupy a position so as to be protected by said V-shaped guard.

JAMES E. WADLINGTON.
    RAYMOND STINNITT.

REFERENCES CITED

The following references are of record in the file of this patent:

UNITED STATES PATENTS

| Number | Name | Date |
| --- | --- | --- |
| 859,144 | Stanley | July 2, 1907 |
| 1,239,957 | Phinney et al. | Sept. 11, 1917 |
| 1,371,348 | Brown | Mar. 15, 1921 |
| 1,435,177 | Peckinpaugh | Nov. 14, 1922 |
| 1,854,024 | Farley | Apr. 12, 1932 |
| 1,929,150 | Peckinpaugh | Oct. 3, 1933 |
| 2,013,898 | Ridenour | Sept. 10, 1935 |
| 2,160,347 | Walsh | May 30, 1939 |
| 2,184,330 | Arbogast | Dec. 26, 1939 |
| 2,242,858 | Franklin | May 20, 1941 |
| 2,258,080 | Thomas et al. | Oct. 7, 1941 |
| 2,295,375 | Adam | Sept. 8, 1942 |
| 2,307,836 | Heddon | Jan. 12, 1943 |